United States Patent
Schumacher

(10) Patent No.: US 10,267,399 B2
(45) Date of Patent: Apr. 23, 2019

(54) VARIABLE CHARGE PUMP SYSTEM FOR CLOSED HYDROSTATIC CIRCUITS

(71) Applicant: Danfoss Power Solutions GmbH & Co. OHG, Neumünster (DE)

(72) Inventor: Andreas Schumacher, Kellinghusen (DE)

(73) Assignee: Danfoss Power Solutions GmbH & Co. OHG, Neumunster (DE)

( * ) Notice: Subject to any disclaimer, the term of this patent is extended or adjusted under 35 U.S.C. 154(b) by 135 days.

(21) Appl. No.: 15/403,218

(22) Filed: Jan. 11, 2017

(65) Prior Publication Data

US 2017/0198796 A1    Jul. 13, 2017

(30) Foreign Application Priority Data

Jan. 12, 2016  (DE) .......................... 10 2016 200 233

(51) Int. Cl.
| | |
|---|---|
| F16H 47/04 | (2006.01) |
| F16H 61/4139 | (2010.01) |
| F16H 61/00 | (2006.01) |

(52) U.S. Cl.
CPC ......... F16H 47/04 (2013.01); F16H 61/0028 (2013.01); F16H 61/4139 (2013.01)

(58) Field of Classification Search
CPC .......... F16H 46/04; F16H 2057/02039; F16B 21/006; F16B 2211/863
See application file for complete search history.

(56) References Cited

U.S. PATENT DOCUMENTS

| | | | |
|---|---|---|---|
| 3,990,327 A | 11/1976 | Margolin | |
| 2008/0238187 A1 | 10/2008 | Garnett et al. | |
| 2014/0255210 A1* | 9/2014 | Hwang | F04C 14/08 417/16 |
| 2016/0116060 A1* | 4/2016 | Schumacher | F16H 61/4157 60/327 |

FOREIGN PATENT DOCUMENTS

| | | |
|---|---|---|
| CN | 102374269 A | 3/2012 |
| CN | 103438206 A | 12/2013 |
| DE | 29711239 U1 | 11/1997 |
| DE | 198 01 766 C2 | 10/2003 |

OTHER PUBLICATIONS

U.S. Statutory Invention Registration No. US H1977 H dated Aug. 7, 2001.

* cited by examiner

*Primary Examiner* — Mark J Beauchaine
(74) *Attorney, Agent, or Firm* — McCormick, Paulding & Huber LLP

(57) ABSTRACT

The invention relates to a charge pump system (190) comprising a hydrostatic charge pump (12) capable to generate a hydraulic flow rate to be fed into a closed circuit of a hydrostatic transmission, a planetary gear set (20), whose planet wheel carrier (22) is connected to an input shaft (11) of the charge pump (12), and whose sun wheel (21) is driveable by a driving shaft (3); and a charge pump motor (30) capable to drive the ring gear (23) of planetary gear set (20).

20 Claims, 2 Drawing Sheets

# VARIABLE CHARGE PUMP SYSTEM FOR CLOSED HYDROSTATIC CIRCUITS

CROSS-REFERENCE TO RELATED APPLICATION

Applicant hereby claims foreign priority benefits under U.S.C. § 119 from German Patent Application No. DE102016200233.3 filed on Jan. 12, 2016, the content of which is incorporated by reference herein.

TECHNICAL FIELD

This invention relates to a variable charge pump system for the use in closed hydrostatic circuits. This invention in particular relates to a charge pump system capable to generate a variable hydraulic charge flow rate to be fed into a closed hydrostatic circuit of a hydrostatic transmission.

BACKGROUND

In closed loop hydrostatic systems, loss of hydraulic fluid occurs due to leakage at movable parts or due to loop flushing, for instance, for cooling high loaded parts or the hydraulic fluid itself. For example, hydraulic fluid flowing through a closed loop hydraulic circuit can escape through internal leaks in the pump and/or the motor, thereby decreasing the system pressure below acceptable margins. In addition, because the hydraulic circuit is closed, fluid circulating in the closed loop can overheat under load conditions. To compensate for the escaping and overheated fluid, closed loop circuits frequently employ fixed displacement pumps, also known as charge pumps having a lower conveying volume than the main pump. These charge pumps are driven commonly by a driving shaft of the main pump or any other drive engine with a constant transmission ratio, i.e. the rotational speed of the charge pump changes proportionally with the rotational speed of the main pump. This means also, that at low rotational speeds of the main pump, the charge pump flow rate is also on a low level and rises proportionally with the increase of the rotational speed of the main pump. As the charge pump capacity has to be sufficient to maintain the hydraulic fluid pressure in the closed hydrostatic circuit also at low rotational speed of the main pump, the charge pump flow rate generated at high speed frequently exceeds the hydraulic fluid losses due to the fix charge pump capacity. Therefore, in these conditions the charge pump flow rate has to be limited by a charge pump pressure relief valve. Usually, the exceeding charge pressure flow rate is released to a tank, normally to the same tank, from which the charge pump sucks hydraulic fluid to fill up the closed hydrostatic circuit.

To avoid these parasitic losses or to avoid surcharging the closed hydrostatic circuit, different solutions in the state of the art have been proposed which cannot eliminate completely these parasitic losses. US 1977H1 (EPO: USH1977H1) provides with a fixed displacement charge pump whose charge flow rate is controlled by an electrohydraulic proportional relief valve controlled by the main controller of the hydrostatic transmission. This system does not use the system pressure for limiting the charge pump flow rate. An excess of charge pump flow rate is still generated at high rotational speeds of the main pump. According to US 1977H1 such an excess of charge pump flow rate is conducted to a tank.

US 2008/0238187 A1 proposes a variable displacement pump for providing a variable charge flow. Thereby, the displacement of the variable charge pump is controlled by a pressure sensor and an actuation device. Here, parasitic losses due to an excess of generated charge fluid flow rate is avoided. By means of the variable displacement pump the charge flow rate can be reduced. Nevertheless, the variable charge pump has to be capable to provide enough charge flow rate to the closed hydrostatic circuit at low rotational speeds of the main pump of the closed hydrostatic circuit. Thus, the capacity of the charge pump at low rotational speeds must be relatively high, i.e. the maximum volumetric size of the variable charge pump has to be relatively high, as the conveying volume of the charge pump is determined at maximum displacement and minimum rotational speed. If the rotational speed is rising, the displacement of the charge pump can be reduced in order to avoid an excess in hydraulic fluid supply. Thus, during operation of the main pump at middle or high revolution speeds the variable charge pump will always be at low displacement. Thus, most of the time a relative high volumetric variable charge pump has to be driven at low displacement. This constitutes parasitic losses, as more power than necessary is applied.

SUMMARY

Therefore, it is object of the present invention to avoid parasitic losses in the charge pump system and to provide a charge pump system capable to charge a closed hydrostatic circuit with an adequate charge flow rate at every rotational speed without wasting power at medium and high rotational speeds of the main hydrostatic transmission pump. At the same time the invention should provide a simple, cost effective and robust charge pump system capable to be installed easily to existing hydrostatic main pumps.

These objects are solved by a charge pump system comprising: a hydrostatic charge pump capable to generate a hydraulic flow rate to be fed into a closed circuit of a hydrostatic transmission; a planetary gear set, whose planet wheel carrier is connected to an input shaft of the charge pump, and whose sun wheel is driveable by a driving shaft; and a charge pump motor capable to drive the ring gear of planetary gear set.

The inventive charge pump system comprises a hydrostatic charge pump capable to generate a hydraulic flow rate to fill up a closed circuit of a hydrostatic transmission. The inventive charge pump system further comprises a planetary gear set whose planet wheel carrier is connected to an input shaft of the hydrostatic charge pump and whose sun wheel is drivable by a driving shaft. Furthermore, the inventive charge pump system comprises a charge pump motor capable to drive the ring gear of the planetary gear set.

By means of the three main components of the inventive charge pump system, the hydrostatic charge pump, the planetary gear set and the charge pump motor it is achieved that the hydrostatic charge pump can be relatively small, because the rotational speed of the hydraulic charge pump can be set variable. Thereby, the charge pump flow rate can be adjusted independently from the working conditions of the main pump. With the inventive charge pump system the rotational speed of the charge pump can be increased or lowered in comparison to the rotational speed of the main pump of the hydrostatic transmission having a closed hydrostatic fluid circuit. Thus, the charge pump flow rate can be adjusted to the needs of the closed hydrostatic fluid circuit by adjusting the rotational speed of the charge pump motor.

In general the rotational speed of the main pump is transmitted to the charge pump with a fixed transmission ratio, such that the minimum rotational speed of the charge pump is determined by the rotational speed of the main pump. However, by means of the planetary gear set which is drivable according to the invention via the ring gear by the charge pump motor providing a second rotational power source for the charge pump, the rotational speed and thus also the charge pump flow rate of the charge pump can be set variably. Depending on the direction of rotation of the ring gear driven by the charge pump motor the rotational speed of the charge pump can be lowered or increased. In order to save energy, a person skilled in the art will choose, for example, the transmission ratio between the main pump and the charge pump as low as possible such that, for instance, at middle speed range of the main pump (main operational speed) the charge pump is driven only via the driving shaft of the main pump. If the rotational speed of the main pump drops and if, simultaneously, a higher charge flow rate for charging the closed hydraulic circuit is necessary, an increase of rotational speed of the charge pump can be achieved according to the invention by means of the charge pump motor driving the ring gear of the planetary gear set. Thereby, the rotational speed of the charge pump motor can be set variable and independent from the main pump according to the charge flow rate needed by the hydrostatic transmission.

In general, with the inventive charge pump system the volumetric capacity of a charge pump can be downsized substantially in comparison to the charge pumps used in the state of the art. As the charge pump flow rate can be adjusted by means of the charge pump motor driving the ring gear of the planetary gear set of the inventive charge pump system, the inventive charge pump system can be of a simple design comprising to common (simple) charge pumps being, for instance, fixed displacements pumps having a relative low volumetric capacity. With the inventive charge pump system in all operational conditions, i.e. at all rotational speeds of the main pump, a charge pump with low volumetric capacity is enough to provide a sufficient charge flow rate by varying the rotational speed of the charge pump only. Such that energy can be saved by preventing parasitic losses as only the minimum amount of energy is used to provide the adequate charge flow rate. No superfluous charge flow rate is generated, neither high inertial weights have to be rotated, accelerated or decelerated.

Thereby, not only the charge pump can be of a simple and small design also the planetary gear set used to provide the second input drive for the charge pump can be designed as simple as possible. Due to the relative small charge pump no high transmission forces have to be transmitted from the charge pump motor via the ring gear to the charge pump. Therefore, one can imagine using plastic materials, for instance reinforced plastic materials, as construction material for the planetary gear set. Thus, the inventive charge pump system provides a charge system for feeding a closed hydrostatic circuit in an effective, low energy consuming, cost-effective, construction space and weight saving manner. Thereby, standard charge pumps as commonly known in the state of the art, can be used having a fix conveying volume, thereby avoiding complex displacement units and controls.

According to the invention, the charge pump flow rate can be adjusted via the second power input on the planetary gear set by the use of a charge pump motor being adjustable in its rotational speed. In one preferred embodiment of the invention, an electric motor controllable in its rotational speed by controlling his power consumption can be used for driving the ring gear of the planetary gear set of the inventive charge pump system. Thereby, the kind of electric motor used for driving the ring gear can be elected freely and is not limited to a special type. For instance, the rotor of the used electric motor forms part of the ring gear such that a compact design of the inventive charge pump system is obtained. However, any kind of DC or AC driven electric motor can be used, which fits best to the operational conditions of the hydrostatic transmission whose closed hydrostatic circuit have to be filled up by the inventive charge pump system.

In a further inventive embodiment the charge pump system further comprises a worm gear or a spur gear by means of which the charge pump motor can be coupled to the ring gear. Hereby, one part of the worm gear or the spur gear can be integrated directly to the ring gear and the other part of the worm gear set or the spur gear set is arranged on the charge pump motor. Depending on the design of the main pump and the hydrostatic closed loop transmission for which the inventive charge pump system is provided the rotational direction of the charge pump motor can be arranged relative to the ring gear in parallel, orthogonal or transverse direction of the rotational axis of the driving shaft of the main pump driving the first input of the charge pump. For instance, by applying a worm gear, the rotational axis of the charge pump motor can be arranged orthogonal to the rotational axis of the charge pump. This can be advantageous for some applications or when constructional space in direction of the rotational axis of the charge pump is not available. For a person skilled in the art, all other kinds of gear sets coupling the charge pump motor to the ring gear of the planetary gear set of the inventive charge pump system are applicable as long as the ring gear can be driven independently by the charge pump motor.

In another embodiment of the inventive charge pump system, a clutch between the charge pump motor and the ring gear can be provided. Such a clutch can be provided additionally to a gearing between the charge pump motor and the ring gear of the planetary gear set. By using a clutch to engage and disengage the charge pump motor from the ring gear of the planetary gear set, other drives than an electric charge pump motor can be used having for instance preselected fixed rotational speeds. Otherwise, one can think about using a clutch for changing the transmission ratio between the charge pump motor and the ring gear of the planetary gear set in order to achieve variable rotational speeds of the charge pump. All these measurements for achieving variable rotational speeds of the charge pump by driving the ring gear of the planetary gear set of the inventive charge pump system are covered by the inventive idea and well known to a person having ordinary skills in the art.

In general, the inventive idea provides for a charge pump system having two power inputs for a standard charge pump being for instance a Gerotor pump, a gear pump, an internal gear pump, a vane pump, a roller vane pump or the like. Thereby, one rotational power input is provided by a charge pump motor driving the ring gear of a planetary gear set. The second rotational power input may be provided by a drive pump or main pump for driving a closed hydrostatic circuit. Such a main pump is driven frequently by an external drive engine, for instance, a combustion engine. Thus, one can imagine that one rotational drive for the charge pump is directly connected to the drive engine. However, common systems show a driving shaft for driving the main pump which as well is used for driving the charge pump. In the sense of the invention, such a driving shaft is coupled to the sun wheel of the planetary gear set of the inventive charge pump system providing such that a first rotational power input for the charge pump system, i.e. to the planetary gear set. The charge pump itself preferably is connected to the planet wheel carrier by means of a driving shaft. Therefore, the transmission ratio between the rotational speed provided by the driving shaft of the main pump and the driving shaft for the charge pump is given by the transmission ratio between the planet wheel carrier and the sun wheel, if the ring gear is standing still. As commonly known, this transmission ratio can be influenced or changed by changing the rotational speed of the ring gear. Thus, the charge pump flow rate for feeding a closed hydraulic circuit of a hydraulic transmission can be adjusted variably according to the operational needs of the hydrostatic transmission.

For instance, if the charge pump motor is not driven, e.g. the electric charge pump motor is not powered, either through the worm gear or by engaging or overrunning the clutch, the ring gear can be blocked or decelerated in order to set a suitable rotational speed of the input shaft of the charge pump being driven in this condition only by the planetary wheel carrier of the planetary gear set. Therefore, in such a state the charge pump motor has to be driven only then, if the charge flow rate demand of the closed hydrostatic circuit is higher as the charge pump flow rate provided at standstill of the ring gear. Consequently, the charge pump flow rate can be adjusted by controlling mechanically, pneumatically or hydraulically the rotational speed of ring gear. Thus, consequently, with the charge pump motor not driving the ring gear, the lowest charge pump flow rate is achieved with the ring gear at standstill and the highest charge pump flow rate is obtained with the ring gear at maximum rotational speed of the charge pump motor. The consequence is that in all operational conditions of a hydrostatic transmission equipped with an inventive charge pump system, the power consumption of the charge pump system is proportional to the demand of charge flow from the closed hydrostatic circuit of the hydrostatic transmission. The inventive charge pump system consumes energy in every state only to that amount being necessary to charge the closed hydrostatic circuit. So, additional power for the charge pump motor is only needed, if the demand of charge flow rate requires higher rotational speeds at the input shaft of the charge pump than the rotational speed provided by the drive shaft of the main pump.

Finally, the inventive charge pump system can be designed and calculated such that an optimum charge flow rate is provided to a closed hydrostatic circuit with minimal parasitic losses. With an adequate election of the planetary gear set the charge pump can be adapted to the necessary rotational speed for providing the optimal charge flow rate at any time. By applying the inventive charge pump system to hydrostatic transmissions with a closed hydrostatic circuit no further parts for limiting the charge pressure or the charge flow rate like pressure relief valves and the like are necessary any more. Further, as it is the case for variable displacement pumps used in the state of the art, the inventive charge pump system do no rotate additional (blind) weights and do not comprise sophisticated displacement mechanism or control mechanisms. With the inventive charge pump system a simple control of charge pressure flow rate is achieved solely and easily by controlling the rotational speed of the charge pump motor.

Charge pumps for hydrostatic transmissions are mounted frequently to the main pump as a separate assembly group and therefore normally, comprise a casing for housing the charge pump components. The inventive charge pump system covers also the idea to provide a charge pump casing in which the charge pump, the planetary gear set and the charge pump motor are arranged. With such an assembly group, the inventive charge pump system possibly can be used as a spare part solution for already existing main pumps used for hydrostatic transmissions comprising a closed hydrostatic circuit. This can be realized in particular, if the interface between common charge pumps and the interface for the inventive charge pump system is designed to be mounted interchangeable.

BRIEF DESCRIPTION OF THE DRAWINGS

In the following the inventive charge pump system will be explained in more details by the help of preferred embodiments and the following figures. Thereby, the shown embodiments do not limit the scope protection and are only used to explain the inventive idea exemplarily. It is shown with.

DETAILED DESCRIPTION

Figure 1:
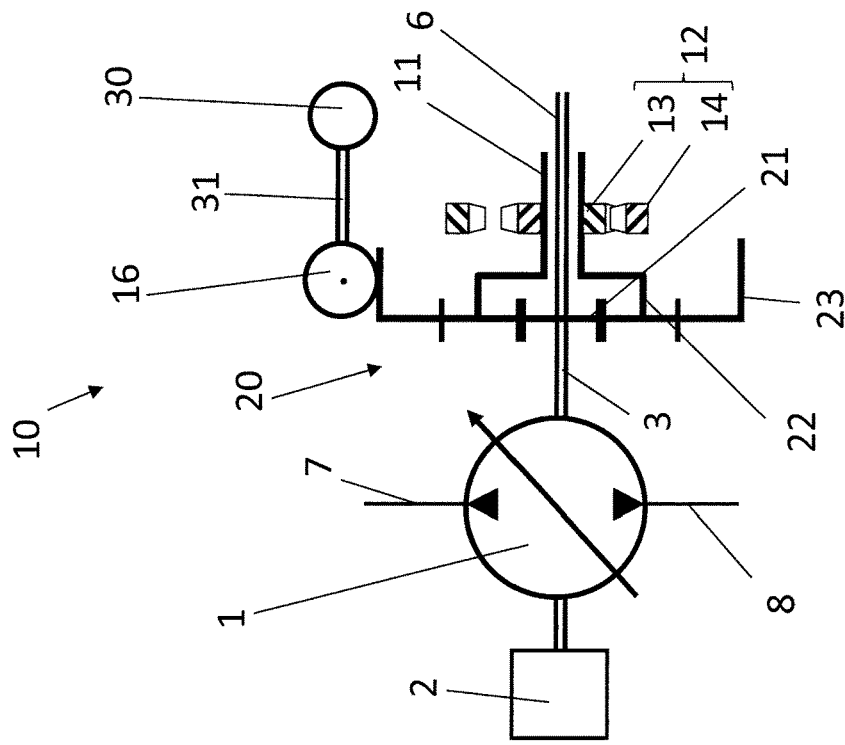
FIG. 1 shows the inventive charge pump system.
Figure 2:
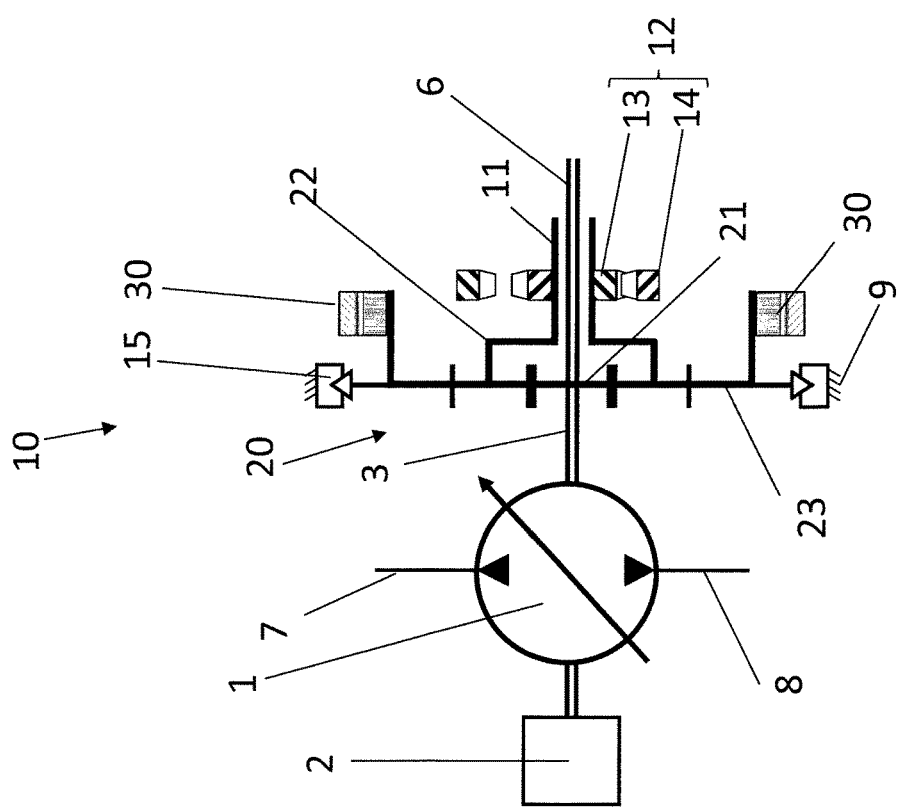
FIG. 2 shows the inventive charge pump system.
Figure 3:
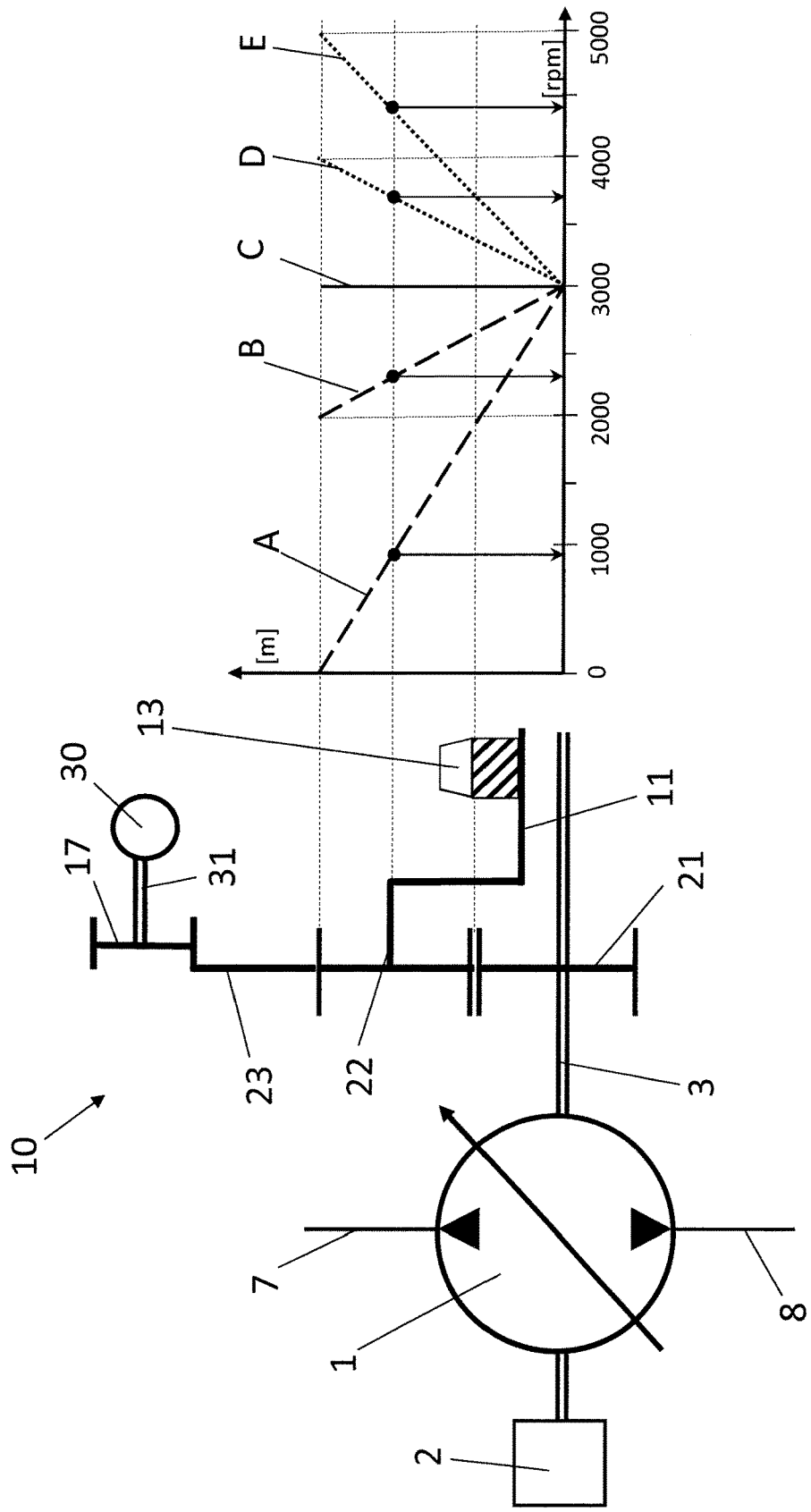
FIG. 3 is a schematic view of the inventive working principle.

Further, for equal parts and assembly groups shown in the FIGS. 1 to 3 the same reference numbers are used for easier comprehension.

In FIG. 1 a first embodiment of an inventive charge pump system 10 coupled to a hydrostatic main pump 1 is shown in a schematic way. Hydrostatic pump 1 is driven by a rotational drive 2, for instance a drive engine of the combustion type. In this embodiment hydrostatic pump 1 is of the variable displacement type, however, can be of the constant or fixed displacement pump type also. Hydrostatic pump 1 conveys hydraulic fluid in a closed hydrostatic circuit indicated in the FIGS. 1 to 3 with working lines 7 and 8. A driving shaft 3 connecting the rotational drive 2 with the main pump 1 drives the sun wheel 21 of a planetary gear set 20. The planet wheel carrier 22 of the planetary gear set 20 is designed as rotational input power for a charge pump 12. In the embodiments shown in FIGS. 1 to 3 the internal gear 13 of the charge pump 12 is driven by a input shaft 11 connected to the planet wheel carrier 22. Naturally, a input shaft 11 driving the external gear 14 of charge pump 12 is also covered by the invention. Depending on the type of charge pump used, the rotatable part of such a charge pump 12 is connected to the planet wheel carrier in order to be driven by the same.

The ring gear 23 of the planetary gear set 20 is drivable by a charge pump motor 30, according to the invention preferably with variable rotational speed. In the embodiment of FIG. 1 a clutch 15 for stopping the ring gear 23 from turning is arranged between the ring gear 23 and, for instance, the casing 9 of the inventive charge pump system 10. In the embodiment shown in FIG. 1 the charge pump motor 30 is of the ring construction type whereas the rotor of charge pump motor 30 is connected to the ring gear 23 and the stator of the same is fixed relative to the charge pump casing 9, for instance.

In operation of hydrostatic pump 1 charge pump 12 is driven via a hollow input shaft 11 connected to the planet wheel gear carrier 22. The sun wheel 21 driving the planet wheel 22 carrier is connected to the drive shaft 3 of hydrostatic pump 1 such that charge pump 12 provides a charge pump flow rate according to the rotational speed of hydrostatic pump 1, if, at the same time, ring gear 23 is standing still. The rotational speed of ring gear 23 and therewith the rotational speed of charge pump 12 can be adapted to the necessary charge flow rate for the closed hydrostatic circuit (not shown) by controlling the rotational speed of charge pump motor 30.

FIG. 2 shows another embodiment of the inventive charge pump system 10, in which the ring gear 23 is driven by a worm gear 16 arranged on the outer side of ring gear 23. Thereby the worm gear 16 is driven by a charge pump motor 30. However, in FIG. 2 the charge pump motor 30 is shown connected in parallel via a driving shaft 31 to worm gear 16. This is for illustration reasons only as the charge pump motor 30 is arranged preferably in direction of rotation of the worm gear 16. As already mentioned above the connection of charge pump motor 30 in order to drive ring gear 23 can be done via a worm gear 16 as shown in FIG. 2 or by any other commonly known transmission gear such as a spur gear, a crown gear, a friction gear or the like.

The inventive idea is not limited either to the embodiment that the drive motor acts on the outer circumferential side of the ring gear 23, since can be arranged also in that way that his drive shaft 31 acts on the internal gear teeth of the ring gear 23 or on a lateral surface. For a person skilled in the art there are a multitude of possibilities to drive ring gear 23 in an adequate way for varying the rotational speed of charge pump 12.

In FIG. 3 a schematic diagram is shown showing five different operation conditions for the charge pump, if the rotational speed of hydraulic pump 1 is maintained constant, for instance at 3000 rpm (rounds per minute). On the right side a Kutzbachplan-diagram is shown for five different operational conditions:

A: Ring gear 23 at standstill
B: rotational speed of ring gear 23 is approx. 2000 rpm
C: rotational speed of ring gear 23 is equal to the rotational speed of drive shaft 3, here e.g. 3000 rpm
D: rotational speed of ring gear 23 is approx. 4000 rpm
E: ring gear 23 is driven by charge pump motor 30 to approx. 5000 rpm According to the Kutzbach-diagram for the operational condition A the resulting rotational speed of the planet wheel carrier 22 is about 900 rpm, whereas for condition B the rotational speed of the charge pump rotor 13 is approx. 2350 rpm. For condition C the rotational speed of the input shaft 11 is equal to the rotational speed of the drive shaft 3, i.e. 3000 rpm. The resulting rotational speeds of the planet wheel carrier 22 and therefore the rotational speed of charge pump 12 for operational conditions D and E result to about 3250 rpm respectively to 4500 rpm.

From FIG. 3, showing five different operational conditions, one can easily derive that the range of the rotational speed of the charge pump 12 can be adjusted in the range between 900 and 4500 rpm by rotating ring gear 23 in a rotational speed range between 0 rpm to 5000 rpm. Furthermore, as the Kutzbach-diagram of FIG. 3 shows left of operational condition C (dashed lines) rotational speeds of the input shaft 11 of the charge pump are lower than the rotational speed of the driving shaft 3, what can be obtained by decelerating ring gear 23. Thereby, according to the example of FIG. 3 with a suitable control/braking of ring gear 23, a rotational speed range of input shaft 11 between approx. 900 rpm (standstill of ring gear 23) and approx. 3000 rpm can be achieved without empowering charge pump motor 30. Only for the operational conditions in which the demanded charge flow rate requires revolutional speeds of the charge pump 12 higher than the rotational speed of drive shaft 3, the charge pump motor 30 have to speed up ring gear 23. This is shown exemplarily in the diagram of FIG. 3, for rotational speeds higher than 3000 rpm (dotted lines). Therefore, in particular, at rotational speeds of the input shaft 11 lower than the rotational speed of drive shaft 3, energy can be saved by e.g. mechanically controlling/reducing the rotational speed of ring gear 23. In this cases energy is saved at the main pump as no excess of rotated weights or charge pump flow rate is generated.

Naturally, for a person skilled in the art any other speed range for the charge pump can be achieved by varying either component of the planetary gear set or by varying the transmission ratio between the hydrostatic pump 1 and the sun wheel 21. In the example of FIG. 3 the transmission ratio is chosen for illustration reasons exemplarily to 1:1.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A charge pump system comprising:
   a hydrostatic charge pump configured to generate a hydraulic flow rate to be fed into a closed circuit of a hydrostatic transmission;
   a planetary gear set, whose planet wheel carrier is connected to an input shaft of the charge pump, and whose sun wheel is driveable by a driving shaft; and
   a charge pump motor capable to drive a ring gear of the planetary gear set.

2. The charge pump system according to claim 1, further comprising a worm gear or a spur gear by means of which the charge pump motor can be coupled to the ring gear.

3. The charge pump according to claim 2, further comprising a clutch by means of which the charge pump motor is coupled to the ring gear.

4. The charge pump system according to claim 2, whereas the charge pump motor is an electric motor controllable in its rotational speed.

5. The charge pump system according to claim 2, whose charge pump is a Gerotor pump, a gear pump, an internal gear pump, a vane pump or a roller vane pump.

6. The charge pump system according to claim 2, whose planetary gear set is made of plastic material.

7. The charge pump according to claim 1, further comprising a clutch by means of which the charge pump motor is coupled to the ring gear.

8. The charge pump system according to claim 7, whereas the charge pump motor is an electric motor controllable in its rotational speed.

9. The charge pump system according to claim 7, whose charge pump is a Gerotor pump, a gear pump, an internal gear pump, a vane pump or a roller vane pump.

10. The charge pump system according to claim 1, whereas the charge pump motor is an electric motor controllable in its rotational speed.

11. The charge pump system according to claim 10, whose charge pump is a Gerotor pump, a gear pump, an internal gear pump, a vane pump or a roller vane pump.

12. The charge pump system according to claim 1, whose charge pump is a Gerotor pump, a gear pump, an internal gear pump, a vane pump or a roller vane pump.

13. The charge pump system according to claim 1, whose planetary gear set is made of plastic material.

14. The charge pump system according to claim 1, whose ring gear is part of an electrical ring motor.

15. The charge pump system according to claim 1, whereas the charge pump system comprise a casing for housing the charge pump, the planetary gear set, the charge pump motor.

16. The charge pump system according to claim 1, whereas either an internal gear or an external gear of the charge pump is driveable via the planet wheel carrier of the planetary gear set.

17. A hydrostatic pump with a charge pump system according to claim 1, whereas the sun wheel of the planetary gear set is driveable by a drive shaft of the hydrostatic pump.

18. A hydrostatic transmission with a closed hydraulic fluid circuit chargeable by a charge pump system according to claim 1.

19. The hydrostatic transmission of claim 18, whereas the sun wheel is driveable by the hydraulic pump of the hydrostatic transmission or by a drive shaft of a rotational drive driving the hydraulic pump of the hydrostatic transmission or by an auxiliary drive engine.

20. The hydrostatic transmission of claim 19, whereas the rotational drive is a combustion engine or an electric motor.

* * * * *